(12) United States Patent
Madden et al.

(10) Patent No.: US 6,377,971 B1
(45) Date of Patent: *Apr. 23, 2002

(54) METHOD AND APPARATUS FOR INSTALLING AND EXECUTING A SINGLE USER TASK IN A MULTI-USER ENVIRONMENT

(75) Inventors: William W. Madden, Boca Raton; Bradley Jay Pedersen, Coral Springs; John Richardson, Boca Raton, all of FL (US)

(73) Assignee: Citrix Systems, Inc., Fort Lauderdale, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 08/605,946

(22) Filed: Feb. 23, 1996

(51) Int. Cl.⁷ .......................... G06F 9/48; G06F 15/177
(52) U.S. Cl. ...................................... 709/108; 709/222
(58) Field of Search ................................ 395/680, 712; 709/300, 302, 107, 108, 220, 221, 222

(56) References Cited

U.S. PATENT DOCUMENTS

| | | | | |
|---|---|---|---|---|
| 5,142,680 A | * | 8/1992 | Ottman et al. | 395/712 |
| 5,155,847 A | * | 10/1992 | Kirouac et al. | 395/712 |
| 5,187,790 A | * | 2/1993 | East et al. | 395/725 |
| 5,247,683 A | * | 9/1993 | Holmes et al. | 395/712 |
| 5,345,588 A | * | 9/1994 | Greenwood et al. | 395/677 |
| 5,619,716 A | * | 4/1997 | Wonaka et al. | 395/712 |
| 5,742,829 A | * | 4/1998 | Davis et al. | 395/712 |
| 6,105,066 A | * | 8/2000 | Hayes, Jr. | 709/226 |
| 6,205,476 B1 | * | 3/2001 | Hayes, Jr. | 709/220 |
| 6,208,991 B1 | * | 3/2001 | French et al. | 707/10 |

OTHER PUBLICATIONS (Microsoft) Microsoft Press. "Advanced MS DOS", 1986.*

* cited by examiner

Primary Examiner—St. John Courtenay, III
Assistant Examiner—Lewis A. Bullock, Jr.
(74) Attorney, Agent, or Firm—Testa, Hurwitz & Thibeault LLP

(57) ABSTRACT

A method and apparatus for installing and executing a single user application on a multi-user system. The method includes the steps of installing a single user application using the installation program of the application, placing the application initialization data in a predetermined location in data storage, obtaining initialization data corresponding to the single user application from the predetermined location in data storage, copying the initialization data into a user specific initialization data, and executing the single user application using the user specific initialization data. The apparatus includes a process installing a single user application, a process placing the application initialization data in a predetermined location in data storage, a process obtaining initialization data corresponding to the single user application from the predetermined location in data storage, a process copying the initialization data into a user specific initialization data, and a process executing the single user application using the user specific initialization data.

21 Claims, 4 Drawing Sheets

METHOD AND APPARATUS FOR INSTALLING AND EXECUTING A SINGLE USER TASK IN A MULTI-USER ENVIRONMENT

FIELD OF THE INVENTION

The invention relates to a method and apparatus for installing and executing programs by a computer and more specifically to a method and apparatus for installing and executing programs by a multi-user computer.

BACKGROUND OF THE INVENTION

Computer systems can be broadly divided into two categories; single user systems and multi-user systems. Single user systems are those in which one user will have control of the processor for the duration of use. Multi-user systems are those in which the computer will permit several users to time-share the processor substantially simultaneously. That is, each user periodically is given a time-slice of the limited amount of computation time available, in a round-robin fashion.

In multi-user systems the computer is capable of executing an application program for one user and, when that user's time-slice of the available computation time is completed, saving the state of the processor and the state of the program so that the application program can be stopped and another user's application program begun. When the first user's time-slice occurs again, the processor will reload the application program, the state of the machine and the state of the program and resume executing the program where the computer left off during the previous time-slice.

When an application program begins to execute, it typically accesses initialization data, typically but not necessarily within an initialization file, which typically contains user specific data regarding how the program is to be executed. For example, a word processing program may have initialization data which specifies what icons the user has defined, what screen colors are to be used and how the screen is to appear geometrically. When an application is developed for use in a multi-user environment, the program is constructed to maintain separate user contexts so that the program uses specific initialization data for each user. Applications developed for single user computers do not typically have the ability to maintain separate user contexts. This is due to the fact that an application developed for a single user computer expects to have only one user context.

With the advent of computer networks, the issue arises that what may have been a single user computer running a single user application is now being used as a network execution server, providing single user application execution for multiple users. A single user application executed from a network execution server must now keep track of the application initialization data which are created for each user.

The present invention addresses this problem thereby permitting single user applications to be executed in multi-user environments.

SUMMARY OF THE INVENTION

The invention relates to a method of installing and executing a single user application on a multi-user system. The method includes the steps of installing a single user application using the installation program of the application, placing the application initialization data in a predetermined location in data storage, obtaining initialization data corresponding to the single user application from the predetermined location in data storage, copying the initialization data into a user specific initialization data location, and executing the single user application using the user specific initialization data. In one embodiment the step of copying the initialization data copies the initialization data into a specified user directory. In another embodiment the step of copying the initialization data includes the step of renaming the initialization data with a unique user name.

The invention also relates to an apparatus for installing and executing a single user application on a multi-user system. The apparatus includes a process installing a single user application, a process placing the application initialization data in a predetermined location in data storage, a process obtaining initialization data corresponding to the single user application from the predetermined location in data storage, a process copying the initialization data into a user specific initialization data, and a process executing the single user application using the user specific initialization data. In one embodiment the process copying the initialization data copies the initialization data into a specified directory. In another embodiment the process copying the initialization data renames the initialization data with a unique user name.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
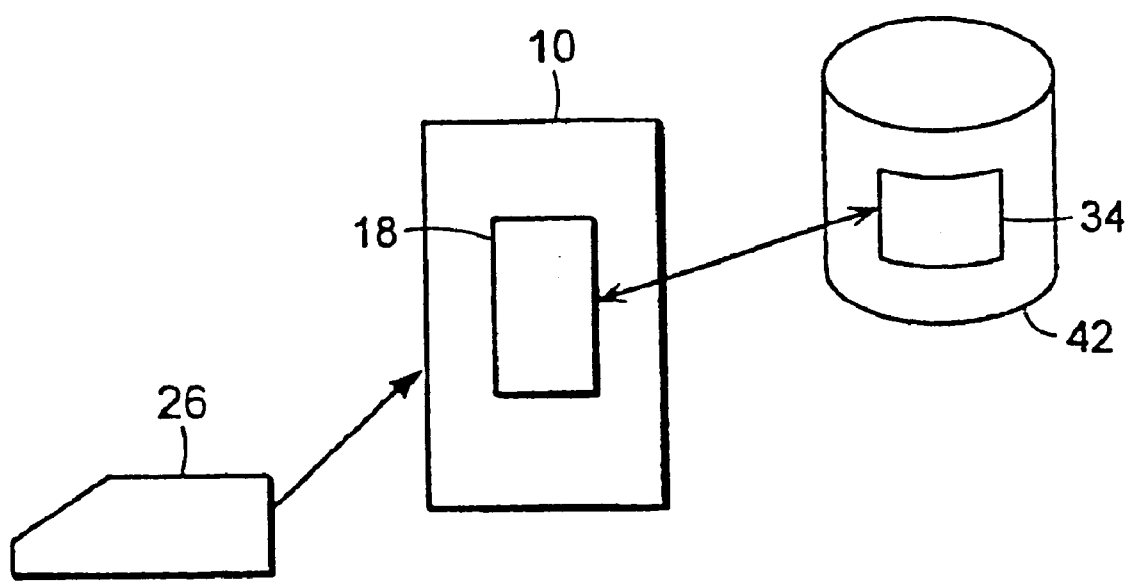
FIG. 1 is block diagram of a single user computer system on which the invention can be practiced.

In brief overview and referring to FIG. 1, a single user computer system on which the invention may be practiced includes a processor 10 executing an application program 18 using data input from an input/output device 26, such as a keyboard and display screen upon execution. The application program 18 is designed to access its initialization data 34, which is typically stored on a disk 42.

Normally when the application is installed, the system is first placed in installation mode, and the installation program of the application uses operating system calls to update or create initialization data in a shared or common system directory (for example \WINDOWSAPPS\). Once the installation is completed, the system is placed in execute mode, and when the application program executes, the application program can then use system calls to query the settings in the initialization data.

Figure 2:
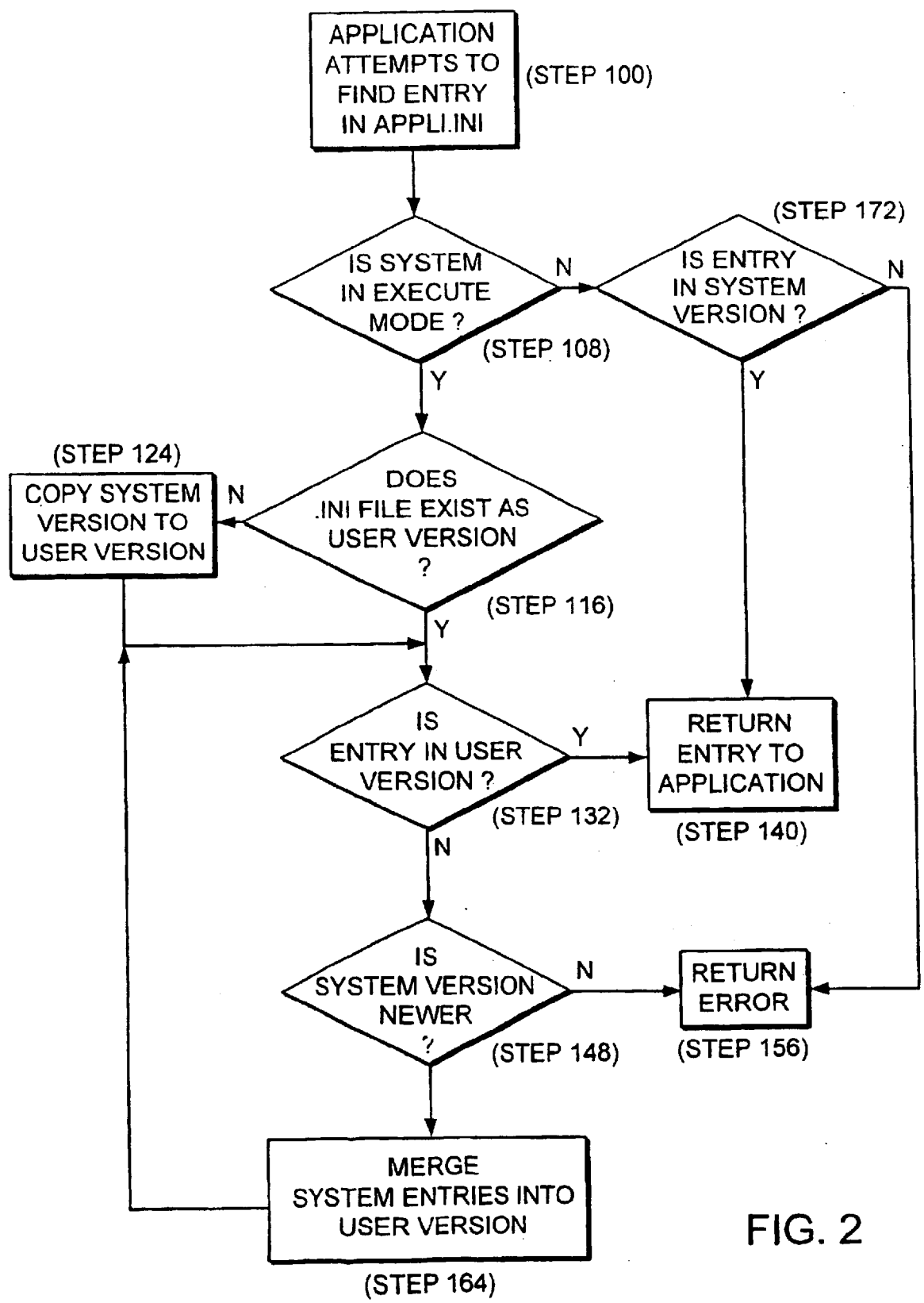
FIG. 2 is a flow diagram of an embodiment of the invention.
Figure 3:
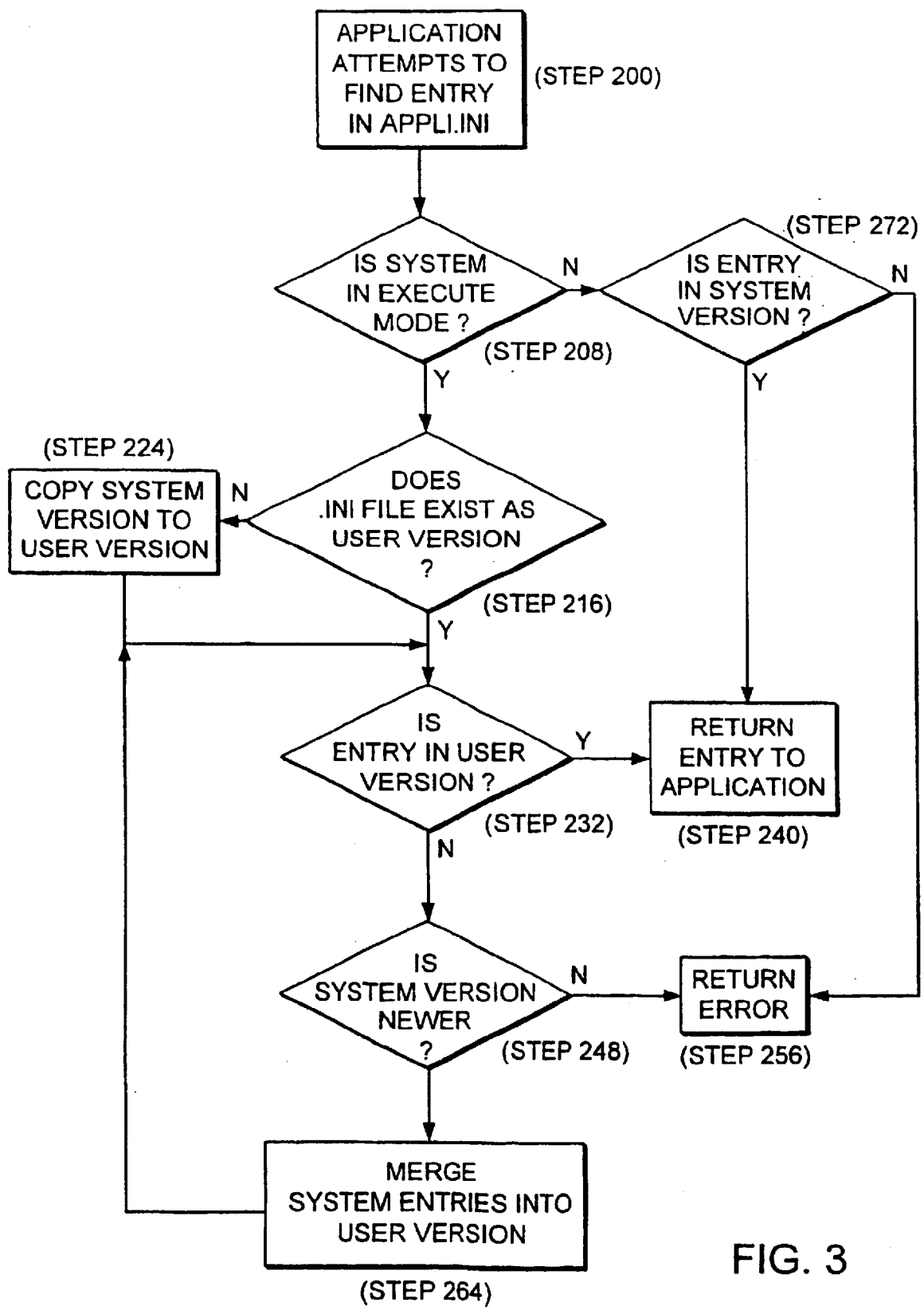
FIG. 3 is a flow diagram of another embodiment of the invention.

In order for a single user application to be executed on a multi-user computer system, it is necessary that different initialization data be maintained for each user on the multi-user system. To accomplish this, in one embodiment of the present invention as shown in FIG. 2, a subdirectory is created by the system manager for each user of the system (for example \USERS\USER1\) when the user's account is created and an initialization subdirectory is created in each user subdirectory (for example \USERS\USER1\WINDOWSAPPS\). It should be noted that it is not necessary that the name of the location of the application subdirectory (\USERS\USER1\WIDOWSAPPS\) under the user subdirectory have the same name as the system common directory (\WINDOWSAPPS\).

When the application begins to execute it attempts to locate an entry in the application initialization data (for example, APPLI.INI) by calling the operating system (Step 100). To find this file, the application makes a call to the operating system which first determines whether the system is in execute or install mode (Step 108). If the system is in execute mode, the call to the operating system attempts to provide a path to the user specific initialization data location (for example \USERS\USER1\WINDOWSAPPS\) by determining whether a user specific version exists (Step 116). If a user version does not exist, the operating system copies the version of the application initialization data (APPLI.INI) from the system directory \WINDOWSAPPS\ to the user directory \USERS\USER1\WINDOWSAPPS\ (Step 124).

If the operating system then finds (Step 132) the entry in the user specific version of the initialization data, it returns the entry to the application (Step 140). If the system fails to find the entry in the user specific version, the operating system determines (Step 148) if the version of the application initialization data in the system directory is newer than the user specific version. The operating system can determine this by examining a time-of-year-stamp which was generated when the file was updated or version number associated with the file. If the system version is not newer than the user specific version, then the entry is not present in any version and the operating system returns an error to the application (Step 156). If the system version is newer, the operating system merges the system entries into the user specific version so as not to lose the changes made by the user (Step 164). In one embodiment, the merge is performed by the operating system only if the operating system determines that a merge is permitted for this file. Whether a merge is permitted is designated on the file by a flag or other indicator attached to the system version of the file, the user specific version of the file, or stored in a separate data structure. In this manner merging may be permitted on a per file basis. The operating system then determines if the entry is in the merged file (Step 132) and proceeds as discussed previously.

If the system is not in execute mode, the operating system only determines if the entry is in the system version of the file (Step 172). If the entry is present in the system version, the system returns the entry to the application (Step 140), and if not the system returns an error to the application (Step 156).

In another embodiment, the application begins to execute as discussed previously and attempts to locate an entry in the application initialization data (for example, APPLI.INI) (Step 200). Again, to find this file, the application makes a call to the operating system which first determines whether the system is in execute or install mode (Step 208). If the system is in execute mode, the call to the operating system returns the path to the unique user specific initialization data location (file name) located in the system directory (for example \WINDOWSAPPS\USER1APPLI.INI) and determines whether a user specific version exists in the directory (Step 216). In one embodiment, the user specific version of the initialization data is named by adding some unique identifier to the name of the initialization data. For example, the unique user specific name USER1APPLI.INI or APPLINUSER1.INI is formed by attaching the user account name (USER 1) to application initialization data (APPLI.INI). Such a user specific name may be formed from the user's account, user's id, user's serial number or other unique user identifier. In yet another embodiment the system uses a lookup table to match a user to a specific file. If a user specific version does not exist, the operating system copies the system version of the application initialization data (APPLI.INI) within the system directory (for example \WINDOWSAPPS\) to a user specific file name by appending the user account name to the application initialization data name as described above (Step 224).

If the operating system then finds (Step 232) the entry in the user specific version, it returns the entry to the application (Step 240). If the entry is not in the user specific version, the operating system determines (Step 248) if the system version of the application initialization data is newer than the user specific version and if it is not newer than the user specific version, then the operating system returns an error to the application (Step 256) as discussed previously. Again, if the system version is newer, the operating system merges (Step 264) the system version entries into the user specific version as described previously. The operating system then determines if the entry is in the merged file (Step 232) and proceeds as discussed previously. Again if the system is not in execute mode, the operating system only determines if the entry is in the system version of the file (Step 272) and again proceeds as discussed previously.

Figure 4:
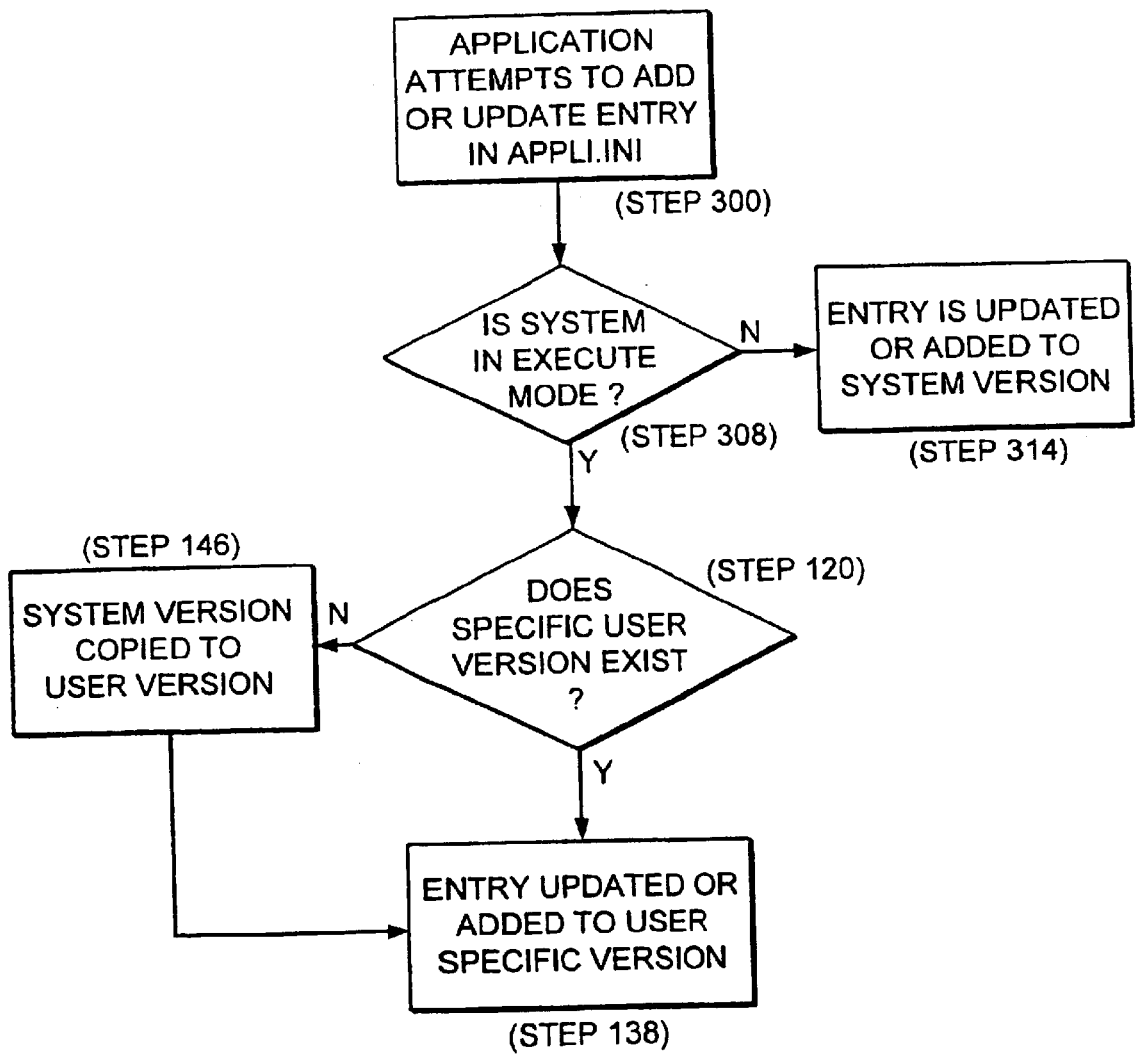
FIG. 4 is a flow diagram of an embodiment of the invention for adding or updating an entry in the initialization data.

Referring to FIG. 4, if an application attempts to update or add an entry to the application initialization data by calling the operating system, the operating system first determines if the system is in the execute or install mode (Step 308). If the system is not in the execute mode, the system version is updated (Step 314). However, if the system is in execute mode, the system first is checked to determine whether a specific user version exists (Step 120). If it does exist, the user specific file initialization data is updated (Step 138). Otherwise, the system version is copied to the user version (Step 146) prior to the entry being added to the user specific version (Step 138). The steps required to determine the location of the user specific files are as discussed above.

For an operating system to be used with the invention, it is necessary that the operating system either have the capability of returning the necessary initialization data location information to application program or that it be modified to return the necessary initialization data location information to the application program when presented with a request. Thus the operating system must be able to return the user specific location of the initialization data if the system is in execution mode or the shared location of the initialization data if the system is in installation mode. For example, in the WINDOWS operating system (Microsoft Corp., Redmond, Washington) the operating system request GetWindowsDir must be modified to return the correct location depending upon whether the system is in installation or execution mode. It is also necessary that the system calls which are used to query or set the initialization entries be modified. Examples of such calls in the WINDOWS operating system are GetPrivateProfileString, GetProfileString, GetProfileSection, and WritePrivateProfileString.

The operating system routines which are used to get or set initialization information need to be able to determine whether the system is in installation or execution mode and respond accordingly. If the system is in installation mode, these calls behave normally, retreiving information from and writing information to the shared location. However, if the system is in execution mode, these routines must determine if a user specific version of the initialization data exists, and if not create a copy in the user specific location from the shared location. An enhancement which supports the merging of new entries from the system version of the initialization data into the user specific version of the initialization data must also be present.

It should be noted that although the above embodiment is described in terms of initialization data being maintained in a directory, the method and apparatus work equally effectively for other directory like structures such as a registry.

Having described preferred embodiments of the invention, it will now become apparent to one of skill in the art that other embodiments incorporating the concepts may be used. It is felt, therefore, that these embodiments should not be limited to disclosed embodiments but rather should be limited only the spirit and scope of the following claims.

What is claimed is:

1. In a multi-user system including a single-user application developed to maintain a context for only one user and having initialization data associated therewith for initially configuring execution of the application, a method of enabling a plurality of users to execute the single user application on the multi-user system comprising the steps of:

forming a user-specific data location corresponding to a user of the multi-user system requesting execution of the application, the user-specific data location residing on a network server;

accessing from the network server the initialization data associated with the single user application;

copying the initialization data associated with the single user application to produce user-specific initialization data corresponding to the user of the multi-user system requesting execution of the single user application;

storing the user-specific initialization data in the user-specific data location;

obtaining by the single-user application a path to the user-specific data location at the start of execution of the single-user application;

accessing by the single-user application the user-specific data location identified by the path to obtain the user-specific initialization data for initially configuring execution of the single-user application.

2. The method of claim 1 wherein the copying step comprises copying the initialization data into one of a plurality of user-specific initialization data stored in the user-specific data location.

3. The method of claim 1 wherein the copying step comprises copying the initialization data into one of a plurality of subdirectories stored in the user-specific data location.

4. The method of claim 1 further comprising the step of renaming the user specific initialization data with a unique user name.

5. The method of claim 1 further comprising the step of overwriting the user-specific intialization data stored in the user-specific data location with modified initialization data, the modified initialization data corresponding to user selections made during tile executing step.

6. The method of claim 1 further comprising forming a user-specific directory corresponding to the user of the multi-user system requesting execution of the application.

7. The method of claim 1 further comprising forming a user-specific registry entry corresponding to the user of the multi-user system requesting execution of the application program.

8. In a multi-user system including a single-user application developed to maintain a context for only one user and having an initialization data associated therewith, for initially configuring execution of the application, a method of enabling a plurality of users to execute the single user application on the multi-user system, the method comprising the steps of:

forming a user-specific data location corresponding to a user of the multi-user system requesting execution of the application, the user-specific data location residing on a network server;

obtaining from the network server initialization data corresponding to the single user application, the obtained initialization data comprising a new entry;

determining if user-specific initialization data already exists in the user-specific data location;

if the user-specific initialization data exists, merging the new entry with the user-specific initialization data on the network server;

obtaining by the single user application a path to the user-specific data location at the start of execution of the single-user application; and accessing by the single-user application the user-specific data location specified by the path to obtain the user-specific initialization data for initially configuring execution of the application.

9. A multi-user system for executing a single user application developed to maintain a context for only one user and having initialization data associated therewith, initially configuring execution of the application, comprising:

a process creating a user-specific data location on a network server corresponding to a user of the multi-user system requesting execution of the application program;

a process obtaining the initialization data from the network server associated with the single user application;

a process copying the obtained initialization data into user specific initialization data stored in the user-specific data location, the user-specific initialization data corresponding to the user of the multi-user system requesting execution of the application;

a process providing to the single user application a path to the user-specific data location at the start of execution of die single-user application; and a process accessing the user-specific data location specified by the path to obtain the user-specific initialization data for initially configuring execution of the application.

10. The system of claim 9 wherein said process copying obtained initialization data copies a file into a user specific location.

11. The system of claim 10 wherein the user specific data location is a directory.

12. The system of claim 11 wherein the directory is a user directory.

13. The system of claim 9 wherein said process copying obtained initialization data renames the user specific initialization data with a unique user name.

14. The system of claim 13 wherein the unique user name comprises a user identifier appended to the name of the application initialization data.

15. The system of claim 9 wherein the user-specific location is a registry entry.

16. A method of maintaining separate user contexts for each user in a multi-user system when executing a single user application, comprising the steps of:

accessing initialization data on a network server corresponding to the single user application, the initialization data establishing a substantially common user context for each user of the multi-user system during the execution of the single user application, wherein each user operates a computer coupled to the network server;

copying the initialization data into user-specific initialization data stored in a user-specific data location on the network server, wherein the user-specific initialization data corresponds to the separate user context for each user of the multi-user system when executing the single user application;

providing to the single user application a path to the user-specific data location;

executing the single user application on the network server using the user-specific initialization data, wherein the user-specific initialization data is modified during the execution of the single user application; and updating the user-specific initialization data stored in the user-specific data location with the modified user-specific initialization data corresponding to modifications made during the executing step, wherein the modified user-specific initialization data is different for each user of the multi-user system.

17. A method of maintaining a separate user context for each user of a multi-user system when executing a shared single user application, comprising the steps of:

accessing the single user application residing on a network server, the single user application allowing only one user of the multi-user system to access and execute an instance of the single user application at any one time, the user operating a computer coupled to the network server;

providing to the single user application a path to the user-specific data location;

executing the single user application on the network server using the user-specific initialization data;

loading user-specific initialization data into a memory of the network server when executing the single user application, the user-specific initialization data corresponding to the separate user context for the user currently executing the single user application;

modifying the user-specific initialization data when executing the single user application; and storing the modified user-specific initialization data in a user-specific data location on the network server, the user-specific data location corresponding to the user currently executing the single user application, wherein the modified user-specific initialization data corresponds to the separate user context formed when the user next executes the single user application.

18. A system for maintaining a unique user execution context, comprising:

a software application residing on a network server accessible by a plurality of users operating computers coupled to the network server, the software application corresponding to a single user application executed on the network server wherein an instance of the single user application can be accessed by only one user of the plurality of users at any one time;

a first set of initialization data stored on the network server and used by the single user application during execution, the first set of initialization data forming a common user context for each user sequentially executing the single user application;

a second set of initialization data stored on the network server and derived from the first set of initialization data, the second set of initialization data being distinct from the first set of initialization data and forming the unique user context for the user executing the single user application, wherein the unique user context varies for each user of the plurality of users.

19. The system of claim 18 further comprising:

a combining module residing on the network server, the combining module copying an element of the first set of initialization data that corresponds to the user requesting execution of the software application and combining the element of the first set of initialization data with changes made by the user during execution of the software program to create an element of the second set of initialization data, wherein the element of the second set of initialization data corresponds to the user requesting execution of the software application.

20. The system of claim 19 further comprising:

a pointing module residing on the network server, the pointing module providing to the software application a path to an element of the second set of initialization data, the element corresponding to a user requesting execution of the software application.

21. In a multi-user system including a single-user application program developed to maintain only one user context and having initialization data associated therewith including settings for initially configuring execution of the application program, a method of enabling a plurality of users to execute the single-user application program on the multi-user system comprising the steps of:

producing a copy of the initialization data for each user that requests execution of the application program on the multi-user system;

uniquely associating each copy of the initialization data with one of the plurality of users requesting execution of the application program;

accessing, for each user requesting execution of the application program, the copy of the initialization data uniquely associated with that user to obtain settings for initially configuring execution of the application program that are specific to the that user.

* * * * *